Sept. 30, 1930.  E. S. CORNELL, JR  1,776,783

HOSE CLAMP

Filed Dec. 6, 1929

Inventor
Edward S. Cornell Jr
by Seymour Earl Nichols
attys

Patented Sept. 30, 1930

1,776,783

UNITED STATES PATENT OFFICE

EDWARD S. CORNELL, JR., OF WATERTOWN, CONNECTICUT, ASSIGNOR TO CHASE COMPANIES, INCORPORATED, OF WATERBURY, CONNECTICUT, A CORPORATION

HOSE CLAMP

Application filed December 6, 1929. Serial No. 412,106.

This invention relates to an improvement in hose clamps and particularly to clamps for attaching flexible hose to faucets or other fittings.

One of the main objects of this invention is to provide at a low cost for manufacture a simple, strong and reliable hose clamp constructed with particular reference to superior holding power and ease of installation and removal.

With the above and other objects in view, my invention consists in a hose clamp having certain details of construction and combinations of parts as will be hereinafter described and particularly recited in the claims.

In the embodiment of my invention illustrated in Figs. 1 to 4 inclusive, I employ a bowed or substantially U-shaped strap-member 11 provided at its respective free ends with integral outturned finger-pieces 12 and 13 by means of which the strap-member 11 may be gripped and tightened about a hose-terminal 14 (indicated by broken lines in Fig. 1) for the purpose of clamping the same upon a faucet or other fixture.

Figure 2:
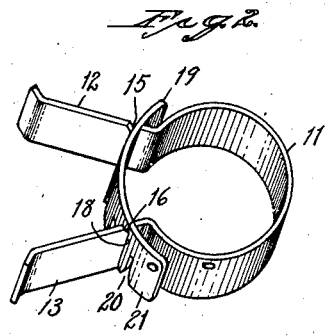
Fig. 2 is a perspective view of the hose clamp.

Adjacent the junction-point of the strap 11 with its outturned finger-pieces 12 and 13 above described, I form the latter with coupling-notches 15 and 16 respectively designed for the reception of an arcuate locking-plate 19, as clearly shown in Fig. 2 of the drawings. The respective outer walls of the said notches 15 and 16 constitute stop-shoulders 17 and 18 acting to prevent the outward displacement of the said locking-plate.

For the purpose of holding the strap 11 in close engagement with a hose-terminal or a hose itself, I provide the above-mentioned arcuate locking-plate 19 in one edge with a series (five more or less) of locking-notches 20 adapted to straddle the finger-pieces 12 and 13 in line with the notches 15 and 16 therein and resulting in the formation of a series of locking-tongues 21 between any two of which the said finger-pieces 12 and 13 are adapted to be held to maintain the strap in snug engagement with the hose or hose-terminal to which it is applied.

Figure 1:
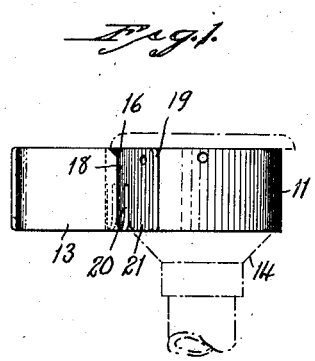
Fig. 1 is a view in side elevation of a hose clamp embodying my invention and shown in connection with the terminal of a flexible hose which is indicated by broken lines.

As shown in Figs. 1 and 2, any given pair of notches 20 in the locking-plate 19 may be aligned respectively with the notches 15 and 16 in the finger-pieces 12 and 13 so that as thus assembled the said locking-plate is nested and occupies the same plane as the plane of the strap 11 and its said finger-pieces so as to present a workmanlike and symmetrical appearance.

Figure 3:
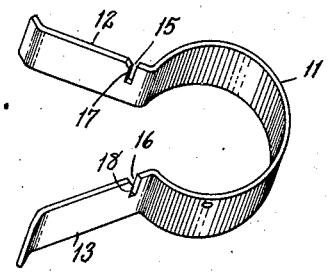
Fig. 3 is a detached perspective view of the strap-member of the hose clamp shown in Figs. 1 and 2.
Figure 6:
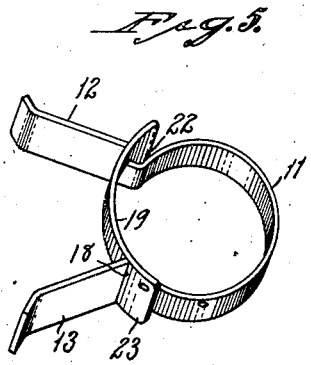
Fig. 6 is a detached perspective view of the strap-member of the clamp shown in Fig. 5.
Figure 5:
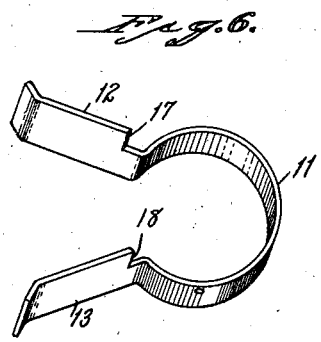
Fig. 5 is a perspective view corresponding to Fig. 2 but showing another form which my invention may assume.
Figure 7:
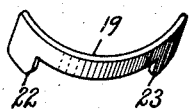
Fig. 7 is a similar view of the locking-plate which is shown in Fig. 5.

In the form of my invention shown in Figs. 5 to 7 inclusive of the drawings, the stop-shoulders 17 and 18 of the finger-pieces 12 and 13 are produced by making the said finger-pieces wider than the strap 11, instead of by notching a strap of uniform width as in the construction shown in Figs. 1 to 3 inclusive.

Figure 4:
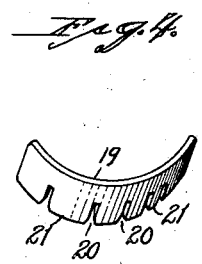
Fig. 4 is a similar view of the locking-plate thereof.

The strap-member as shown particularly in Fig. 6 is adapted to readily receive either the type of locking-plate shown in Fig. 4 or a locking-plate 19 of the type shown in Fig. 7 which latter is formed with but two locking-tongues 22 and 23 respectively located at its opposite ends.

In applying my improved hose clamp to a hose-terminal such as is indicated by broken lines in Fig. 1, the strap 11 is put in position by separating the finger-pieces 12 and 13, after which the two said finger-pieces are manually gripped and drawn together until the strap has tightly gripped the hose-terminal or equivalent part. A locking-plate 19 is now positioned back of the stop-shoulders 17 and 18 so that a pair of locking-tongues will be in engagement with the outer face of both of the said finger-pieces, as clearly shown in Figs. 2 and 5, whereby the strap 11 will be held tightly in engagement with the hose-terminal 14 or other part to which it has been applied.

My improved hose clamp may be readily removed by drawing the finger-pieces 12 and 13 together so as to relax the stress upon the locking-plate, after which the latter may be removed and the grip upon the said finger-pieces relaxed to permit the removal of the hose-terminal.

By employing a locking-plate of the form shown in Fig. 4, I am enabled to provide in a single clamp for the gripping of hose-terminals or similar parts having a wide variety of sizes and for this reason prefer to employ that form of locking-plate, though in many instances it is advantageous to employ a locking-clamp designed specifically for a certain size of hose-terminal in which case a locking-plate of the form shown in Fig. 7 will serve with either of the two forms of strap-member shown respectively in Figs. 3 and 6.

While I have shown and described my improved hose clamp as engaging a hose-terminal, it is obvious that it may be directly engaged with the ends of such hose as are not provided with terminals.

I claim:

1. A hose clamp comprising a unitary bowed strap-member formed of flexible material and provided at its respective opposite ends with a pair of complementary outturned finger-pieces; and a locking-plate provided with a plurality of locking-tongues engaging the free ends of the said bowed strap-member and extending substantially parallel with the axis of the said strap-member.

2. A hose clamp as defined in claim 1 and having the locking-plate of arcuate form to approximate the curvature of a hose or hose-terminal.

3. A hose clamp comprising a unitary bowed strap member formed of flexible material and provided at its respective opposite ends with a pair of complementary outturned finger-pieces; and a locking-plate formed in one edge with a plurality of notches adapted to receive the free ends of the said bowed strap and extending substantially parallel with the axis thereof.

4. A hose clamp comprising a bowed strap-member formed of flexible material and provided at its respective opposite ends with a pair of complementary outturned finger-pieces, each of which is provided with an inwardly-facing stop-shoulder; and a locking-plate provided in one edge with a plurality of locking-tongues engaging the said outturned finger-pieces between the said stop-shoulders thereon and the bowed portion of the said strap-member.

5. A hose clamp comprising a bowed strap-member formed of flexible material and provided at its respective opposite ends with a pair of complementary outturned finger-pieces, each of which is formed with a transverse notch providing an inwardly-facing stop-shoulder; and a locking-plate adapted to enter the said notches and provided in one edge with a plurality of locking-tongues adapted to engage the outer faces of the said finger-pieces.

In testimony whereof, I have signed this specification.

EDWARD S. CORNELL, Jr.